(12) United States Patent
Schliwa-Bertling et al.

(10) Patent No.: US 9,232,435 B2
(45) Date of Patent: *Jan. 5, 2016

(54) METHODS AND DEVICES FOR PROVIDING TFI

(71) Applicant: Telefonaktiebolaget L M Ericsson (publ), Stockholm (SE)

(72) Inventors: Paul Schliwa-Bertling, Ljungsbro (SE); Stefan Eriksson Löwenmark, Hässelby (SE); Olof Liberg, Beijing (CN); Mårten Sundberg, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

This patent is subject to a terminal disclaimer.

(21) Appl. No.: 13/698,433

(22) PCT Filed: Nov. 8, 2012

(86) PCT No.: PCT/SE2012/051219
§ 371 (c)(1),
(2) Date: Nov. 16, 2012

(87) PCT Pub. No.: WO2013/070163
PCT Pub. Date: May 16, 2013

(65) Prior Publication Data
US 2014/0064194 A1 Mar. 6, 2014

Related U.S. Application Data

(60) Provisional application No. 61/556,883, filed on Nov. 8, 2011.

(51) Int. Cl.
*H04W 4/00* (2009.01)
*H04W 28/06* (2009.01)
(Continued)

(52) U.S. Cl.
CPC ........... *H04W 28/065* (2013.01); *H04L 1/0029* (2013.01); *H04L 1/0041* (2013.01);
(Continued)

(58) Field of Classification Search
CPC ..................................................... H04W 28/04
USPC ........................................................ 370/329
See application file for complete search history.

(56) References Cited

U.S. PATENT DOCUMENTS

| 7,092,373 B2 * | 8/2006 | Parantainen et al. | 370/337 |
| 2008/0307284 A1 | 12/2008 | Aghili et al. | |
| 2011/0194410 A1 | 8/2011 | Bergstrom et al. | |
| 2012/0269145 A1 * | 10/2012 | Widell et al. | 370/329 |

OTHER PUBLICATIONS

3GPP TS 22.368 V11.3.0 (Sep. 2011) "3rd Generation Partnership Project; Technical Specification Group Services and System Aspects; Service requirements for Machine-Type Communications (MTC); Stage 1 (Release 11)", 650 Route des Lucioles, Sophia Antipolis, Valbonne, France; 24 pages.

(Continued)

*Primary Examiner* — Christopher R Crompton
(74) *Attorney, Agent, or Firm* — Myers Bigel Sibley & Sajovec, P.A.

(57) ABSTRACT

Methods and devices for generating a TFI are described. In some embodiments an extended TFI with more bits than a legacy TFI is provided and the bits of the extended TFI are added in a RLC/MAC data block or in a PAN addressing field.

16 Claims, 2 Drawing Sheets

(51) Int. Cl.
  *H04L 1/00* (2006.01)
  *H04W 72/04* (2009.01)
  *H04W 72/12* (2009.01)
  *H04L 1/16* (2006.01)

(52) U.S. Cl.
  CPC ............. *H04L1/0073* (2013.01); *H04W 28/06* (2013.01); *H04W 72/04* (2013.01); *H04L 1/0061* (2013.01); *H04L 1/1664* (2013.01); *H04W 72/1289* (2013.01)

(56) References Cited

OTHER PUBLICATIONS

3GPP TS 45.003 V11.0.0 (2012-09) "3$^{rd}$ Generation Partnership Project; Technical Specification Group GSM/EDGE Radio Access Network; Channel coding (Release 11)", 650 Route des Lucioles, Sophia Antipolis, Valbonne, France; 321 pages.
3GPP TS 44.060 V11.0.0 (Mar. 2012) "3$^{rd}$ Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 11)", 650 Route des Lucioles, Sophia Antipolis, Valbonne, France; 624 pages.
International Search Report and Written Opinion Corresponding to International Application No. PCT/SE2012/051219; Date of Mailing: Feb. 25, 2013; 12 Pages.
Siemens, "Outstanding issues of the multiple TBF concept", 3GPP TSG GERAN #6, GP-011548, Naantali, Finland, Aug. 27-31, 2001, 15 Pages.
Telefon AB LM Ericsson: "GERAN IMTC: Discussion on identifiers", 3GPP TSG GERAN #48, GP-101953, San Jose Del Cabo, Nov. 22-26, 2010, 17 Pages.

* cited by examiner

METHODS AND DEVICES FOR PROVIDING TFI

CROSS-REFERENCE TO RELATED APPLICATION

This application is a 35 U.S.C. §371 national stage application of PCT International Application No. PCT/SE2012/051219, filed on 8 Nov. 2012, which claims priority to U.S. Provisional Application No. 61/556,883, filed on Nov. 8, 2011. The disclosures of the applications are hereby incorporated herein in their entireties by reference.

TECHNICAL FIELD

The invention relates to the Temporary Flow Identity (TFI) field in a cellular radio network, in particular a GSM/EDGE Radio Access Network (GERAN) network.

BACKGROUND

So far, the traffic generated in mobile networks such as e.g. GERAN, UTMS Radio Access Network (UTRAN) has mostly been dominated by services that require human interaction, such as e.g. regular speech calls, web-surfing, sending Multimedia Messaging Service (MMS), doing video-chats etc. The same traffic pattern is also anticipated for Evolved UTMS Radio Access Network (E-UTRAN). As a natural consequence, these networks are designed and optimized primarily for these "Human Type Communication" (HTC) services.

There is however an ever-increasing market segment of Machine Type Communication (MTC) services, which does not necessarily need human interaction. MTC devices support a very diverse flora of applications such as e.g. vehicle applications (automatic emergency calls, remote diagnostics and telematics, vehicle tracking etc.), gas- and power-meter applications as well as network surveillance and camera applications. The requirements these services puts on the serving network will thus without any doubt significantly differ from what is provided by today's HTC-optimized mobile networks, as outlined in Third Generation Partnership Program (3GPP) Technical Specification TS 22.368. The amount of these MTC and HTC devices could reach a total of near 50 billion in the year 2020. Thus, for mobile networks such as GERAN to be competitive for these mass market MTC applications and devices, it is important to optimize their support for machine-type communications.

At the same time the market penetration by the so called smartphones is very aggressively increasing. One typical smart phone characteristics is to issue small data transfers e.g. to keep the firewall protecting the 3GPP network opened. These short transactions consume many identifiers while requiring low bandwidth. This may easily result in "identifier depletion" as well as "under-utilization" of the actual radio resources. To overcome this problem more identifiers are needed so that a larger number of such transactions can be multiplexed on shared radio resources.

Currently for GERAN, each Temporary Block Flow (TBF) is assigned a Temporary Flow Identity (TFI) value by the network. This value is unique among concurrent TBFs in the same direction (uplink or downlink) on all Packet Data Channels (PDCHs) used for the TBF. The same TFI value may be used concurrently for other TBFs on other Packet Data Channels (PDCHs) in the same direction and for TBFs in the opposite direction. Hence a TFI is a unique identifier on a given resource (PDCH). This limits the number of concurrent TBFs and thus limits the number of devices that may share the same radio resources to the number of existing TFIs.

The existing TFI itself is a 5-bit field encoded as binary number in the range 0 to 31, which is typically provided to the Mobile Station (MS) by the GERAN network upon assignment.

An Radio Link Control/Medium Access Control (RLC/MAC) block associated with a certain TBF is thus identified by the TFI together with, in case of a RLC data block, the direction (uplink or downlink) in which the RLC data block is sent; and in case of a RLC/MAC control message, the direction in which the RLC/MAC control message is sent and the message type. In case of Starting Sequence Number (SSN)-based Fast Ack/Nack Reporting (FANR) is used, then the TFI identifying the TBF being acknowledged is included in the Piggy-backed Ack/Nack (PAN) field.

This means that e.g. every time an MS receives a downlink data or control block, it will use the included TFI field to determine if this block belongs to any (there can be more than one) of the TBFs associated with that very MS. If so, the block is obviously intended for this MS whereupon the corresponding payload is decoded and delivered to upper layers, but otherwise discarded. In the uplink direction, the behavior is the same, i.e. network uses the TFI value to identify blocks that belong to the same TBF.

It can be noted that the TFI for the RLC data block(s) and the TFI for the PAN can be addressed to different TBFs and thus different MSs.

The existing TFI addressing space can be insufficient assuming the increase of MTC and smartphone driven transactions. As the Piggy Backed Ack/Nack (PAN) field that can be included in the RLC/MAC data block can be addressed to another receiver than the actual RLC/MAC data block, the overall challenge is twofold:
 increase the TFI addressing space for addressing the RLC/MAC data block receiver.
 increase the TFI addressing space for addressing the PAN receiver.

SUMMARY

It is an object of the present invention to provide improved methods and devices to address at least some of the problems set out above and in particular to solve problems related to the existing TFI address space limitations.

This object and potentially others are obtained by the methods and devices as set out in the appended claims.

In accordance with embodiments described herein methods for extension of the TFI address space included in the RLC/MAC data blocks are provided.

Thus, in accordance with some embodiments a method of using a TFI in a Base Transceiver Station of a GERAN network is provided. The method can equally be employed in a mobile station for uplink transmission. The TFI comprises a first number of bits; where the TFI addresses a TBF of a RLC/MAC data block or a PAN. The method comprises addressing the TBF of a RLC/MAC data block or a PAN using a TFI having an increased number of bits compared to the first number of bits and/or using a new RLC/MAC header Cyclic Redundancy Check (CRC) generator polynomial for addressing the TBF of the RLC/MAC data block or the PAN.

In accordance with some embodiments a CRC sum of the entire RLC/MAC header (or of parts of it) is formed at the transmitter. The CRC sum is modified to convey TFI or PAN Indicator (PANI) information. The principle can be used in either Downlink (DL) or Uplink (UL). The generator polynomial used by the transmitter to generate the CRC sum can either be assigned to the receiver or be arrived at by the receiver when iterating through a common set of generator polynomials until it finds the polynomial used by the transmitter.

The term "new" as used below for new CRC sum generator polynomials refers to a CRC sum generator polynomial which is different from the existing header CRC generator polynomial. A "new" CRC will also be termed secondary CRC.

In accordance with one embodiment a number of N new CRC sum generator polynomials are introduced for the encoding/decoding of the RLC/MAC header. As the existing TFI space will form a unique combination with each generator polynomial this will result in that the TFI addressing space increases from supporting 32 to 32×(N+1) identifiers.

In accordance with another embodiment the transmitting and encoding entity adds an extension TFI field, here referred to as the eTFI field, to the existing TFI and performs a binary XOR operation of the eTFI field with the CRC sum of the RLC/MAC header. This new eTFI field can be up to 8 bit long, and increase the total TFI addressing space (TFI+eTFI) from 32 to $32 \times 2^8$ identifiers.

In accordance with yet another embodiment the 1-bit PAN Indicator (PANI) (header octet 1, bit 7) is used to convey a TFI extension instead of PAN information, so that 6 instead of 5 bits can be used for TFI purposes. In order to retain PANI information, a binary XOR operation of the 1-bit PAN Indicator is performed with the CRC sum of the RLC/MAC header that is calculated using a new CRC generator polynomial. The PANI field is thus moved from the information bits of the RLC/MAC header to be XORed with the RLC/MAC header CRC sum. The new generator polynomial together with the extended TFI field supports 64 new TFI identifiers, thereby increasing the TFI addressing space from 32 to 96 identifiers.

In accordance with yet another embodiment the Block Sequence Numbering (BSN) space is reduced as bits are removed from the BSN header field and instead used to extend the TFI field. The TFI addressing space will then be increased from 32 to $32 \times 2^Y$ identifiers, where Y equals the number of bits moved from the BSN header field to extend the TFI.

As there is an option to include PAN data in a radio block that can be addressed to a different TBF and receiver than the RLC/MAC data of the radio block, there exists the requirement to provide the PAN receiver's TBF identity, the TFI, in the PAN field. This is achieved by performing a binary XOR operation of the 5 bit TFI field with the PAN field CRC sum. However, as the CRC sum occupies 10 bits, the existing TFI field can be extended with an additional 5 bits to create a 10 bit TFI field. Application of a new PAN CRC generator polynomial will further increase the identifier space as it distinguishes the new 10 bit TFI from the existing 5 bit TFI field. The new generator polynomial and extended TFI field together increases the TFI addressing space that can be used for PAN addressing from 32 to $32 \times 2^{10}$ identifiers.

The invention also extends to receivers and transmitters arranged to perform the methods as described herein. The receivers and transmitters can be provided with a controller/controller circuitry for performing the above methods. The controller(s) can be implemented using suitable hardware and/or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Other objects and advantages of the invention will become apparent from the following detailed description of the invention.

BRIEF DESCRIPTION OF THE DRAWINGS

For a better understanding, reference is made to the following drawings and preferred embodiments of the invention.

DETAILED DESCRIPTION

Figure 1:
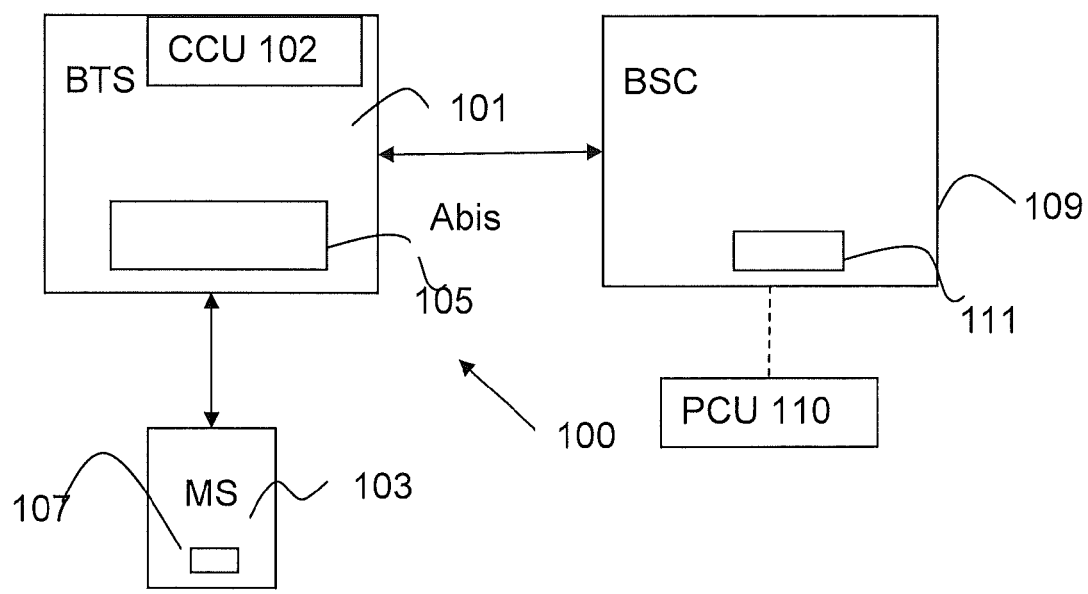
FIG. 1 illustrate a cellular radio system.

In FIG. 1 a general view of a cellular radio system 100 is depicted. The system 100 depicted in FIG. 1 is a GERAN system. However it is also envisaged that the system can be another similar system. The system 100 comprises a number of base stations or Base Transceiver Station (BTS) 101, whereof only one is shown for reasons of simplicity.

The base station 101 can be connected to by mobile stations (MS) in the figure represented by the MS 103 located in the area served by the base station 101. Further, the base stations 101 are controlled by a central node such as a Base Station Controller (BSC) in the case of a GERAN system. In case of GERAN system the BTS and the BSC form a base station system (BSS) and are connected over an Abis interface. The BTS 101 can comprise one or many Channel codec units (CCU) 102. Also the BSC can be associated with a Packet Control Unit (PCU) 110. The base station, the central node and the mobile station further comprise controllers/controller circuitry 105, 111 and 107 for providing functionality associated with the respective entities. The controllers 105, 107 and 111 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

In order to increase the TFI space in a system as exemplified in FIG. 1 the transmitters and receivers of the air interface, i.e. the transmitters and receivers of a mobile station and a BTS, can be configured to employ one or several of the methods described herein. The methods can be divided into two groups; a first group extending the TFI addressing space for the receiver of the RLC/MAC data block and a second group extending the TFI addressing space for the receiver of PAN.

Figure 2:
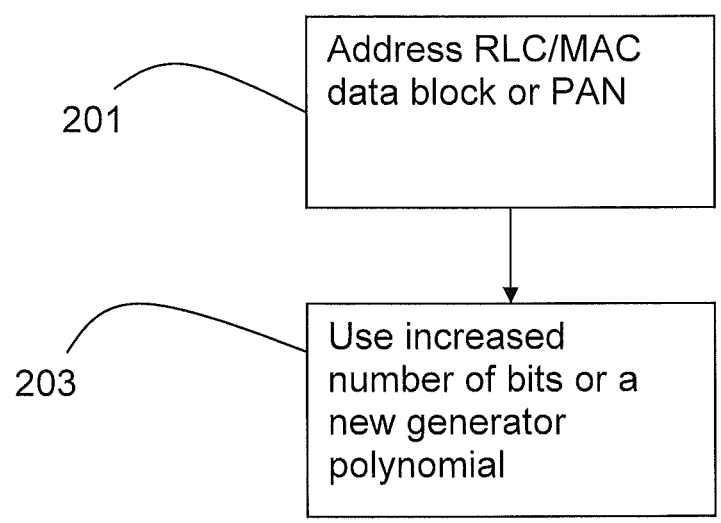
FIG. 2 is a flow chart illustrating some steps performed when generating a TFI.

In FIG. 2 a flowchart illustrating some steps that can be performed when using a TFI in a GERAN BSS. It is assumed that the TFI comprises a first number of bits, where the TFI addresses a TBF of a RLC/MAC data block or a PAN. First in a step 201 the TBF of said RLC/MAC data block or said PAN is addressed. Next in a step 203 a TFI having an increased number of bits compared to the first number of bits and/or a new generator polynomial is used for addressing the TBF of the RLC/MAC data block or the PAN.

The general method of addressing a TBF set out above will now be described in more detail using some detailed examples. First some embodiments targeting the RLC/MAC data block TFI addressing space are explored.

Extension of TFI in the RLC/MAC Data Block

First Embodiment

In a first exemplary embodiment N new CRC generator polynomials are introduced for the RLC/MAC header. In accordance with such an embodiment these new CRC generator polynomials are available for the RLC/MAC header CRC sum calculation. In the case of a GERAN system, as presented in FIG. 1, 3GPP TS 45.003 v 11.0.0 defines the process of CRC parity bit calculation using a CRC generator polynomial.

Given that legacy MSs won't be able to decode the RLC/MAC header when one of the N new CRC generator polynomial is used, the TFI-field in the RLC/MAC header coded in a conventional manner can be fully re-used for new MSs while at the same time used for legacy MSs when the header is encoded with the existing legacy CRC generator polynomial. The result is an N times increase of the TFI addressing space.

Introducing N new CRC generator polynomials for the RLC/MAC header in the downlink direction will typically require that the BTS is aware of the TFI and the CRC generator polynomial it shall use during the encoding process. This information can be provided to the CCU (Channel Codec Unit) 102 from the PCU (Packet Control Unit) 110 over the Abis interface as illustrated in FIG. 1.

In the uplink direction it can be assumed that the BTS can use the CRC generator polynomials during the decoding process. One alternative for the BTS is to iterate through a common set of generator polynomials to find the correct polynomial to perform the decoding. Alternatively the BTS can be configured to keep track of the TFI value used for each connection and based on the USF (Uplink State Flag) scheduling in the DL determine whether or not the legacy (primary) CRC code, or a new (secondary) CRC should be used.

In the downlink direction it can be assumed that MSs which support reception of the PAN-field will typically be required to perform a multiple CRC header decoding as the PAN field may be included in either an RLC/MAC block where the RLC/MAC header CRC is calculated using the legacy (primary) or a new (secondary) generator polynomial. This multiple CRC decoding can in accordance with some embodiments only be used if an MS is assigned a Temporary Block Flow (TBF) using Reduced Latency functionality with Fast Ack/Nack Reporting (FANR).

Second Embodiment

In accordance with a second embodiment the encoding entity performs a XOR operation of a new, additional TFI field, denoted here as Extended TFI (eTFI), with the CRC of the RLC/MAC header.

Given that the RLC/MAC header CRC is 8-bit long, this new eTFI field can be an 8 bit long field. The 8 bit eTFI field can be combined with the 5 bit legacy TFI field without consideration of the collisions with the usage of the same code words by legacy MSs. This is possible as the legacy MSs won't be able to decode the RLC/MAC header CRC given that it is XOR'ed with the eTFI. The 8 bit eTFI field can not chosen as '00000000', since this choice implies not XORing with the eTFI, and as such corresponds to the legacy operation. This extension results in a 13 bit TFI field, causing an increase of addressing space by $2^8$ times.

In a first implementation in accordance with the second embodiment, the XOR operation of the assigned eTFI value with the RLC/MAC header CRC prohibits the possibility for a successful decoding of the RLC/MAC header to the set of MSs which has been assigned a particular eTFI field. This means that the PAN field, if included in the RLC/MAC data block, can only be received by the set of MS assigned the same 8 bit eTFI as the MS to which the actual RLC/MAC data block is addressed. Given the legacy 5 bit TFI field, up to 32 MSs can be assigned the same eTFI field.

In another, second, implementation of the second embodiment, the new MS will be aware of a common set of eTFI values, among which one equals the eTFI value assigned to the MS. This common set will determine the number of TBFs that can be multiplexed on a PDCH. The size of the common set can be determined per PDCH depending on the TBF capacity needed for that actual PDCH. In this implementation the MS is allowed to decode the RLC/MAC header and the PAN-field in TBFs addressed to it self as well as in TBFs address to MSs assigned an eTFI belonging to the common set of eTFI values. The first implementation of the second embodiment can be seen as a special case of the second implementation, where only the 00000000 eTFI value is included in the common set. This eTFI value allows new MSs to decode the RLC/MAC header in TBFs addressed to legacy mobiles, to detect the presence of a PAN-field.

In both the first and second implementation of the second embodiment new MSs which support reception of the PAN-field will typically be required to perform a decoding of the RLC/MAC header in the downlink followed by an XOR operation between the RLC/MAC header CRC and its assigned eTFI to detect if the RCL/MAC data belongs to its own TBF. If this is not the case then the MS can iterate through the eTFIs in the common set to be able to read the RLC/MAC header to detect the presence of a PAN-field.

In the second embodiment it is typically required that in the downlink direction the BTS is aware of the TFI value and whether the XOR operation on the CRC shall be performed during the encoding process. This information can be provided to the CCU from the PCU over the Abis interface.

In the uplink direction it can be assumed that the BTS is aware of the TFI in the decoding process.

Third Embodiment

In accordance with a third embodiment the one bit PANI field in a legacy header is used to extend the current 5 bit TFI field to a 6 bit field. The PANI can however still implicitly signaled to the receiving entity by means of XORing the PANI bit with the RLC/MAC header CRC generated by a new CRC generator polynomial.

By XORing a common field to a receiver (the PANI indicator which can take on value 0 or 1) there will be no dependency on the entire TFI allocated and the possibility to read the PANI field.

The upper table below is taken from 3GPP TS44.060 060 v11.0.0 and shows the current header format of some Modulation and Coding Schemes (MCS) namely, MCS-7, MCS-8, MCS-9. The lower table below illustrates how the existing header formats can be altered to allow for a 6 bit TFI field.

| Bit | | | | | | | | Octet |
| --- | --- | --- | --- | --- | --- | --- | --- | --- |
| 8 | 7 | 6 | 5 | 4 | 3 | 2 | 1 | |
| TFI | | PANI | | CES/P | | USF | | 1 |
| BSN1 | | | PR | | TFI | | | 2 |
| BSN1 | | | | | | | | 3 |
| BSN2 | | | | | | BSN1 | | 4 |
| CPS | | | | | BSN2 | | | 5 |

| Bit | | | | | | | | |
|---|---|---|---|---|---|---|---|---|
| 8 | 7 | 6 | 5 | 4 | 3 | 2 | 1 | Octet |
| eTFI | CES/P | | | | USF | | | 1 |
| BSN1 | PR | | | TFI | | | | 2 |
| BSN1 | | | | | | | | 3 |
| BSN2 | | | | | | | BSN1 | 4 |
| CPS | | | | | BSN2 | | | 5 |

An implementation in accordance with the third embodiment will give rise to a three times larger TFI addressing space but does not result in any restrictions for the eTFI value to be the same for new mobiles in order to read the PANI field. It is not possible to schedule PANs to MSs not aware of the new CRC.

Further an implementation in accordance with the third embodiment will typically require that in the downlink direction, the BTS is aware of the TFI value and whether the new generator polynomial shall be applied during the encoding process. This information can be to be provided to the CCU from the PCU over the Abis interface.

Fourth Embodiment

In a fourth exemplary embodiment, the number of bits used for the Block Sequence Number BSN field(s) in the RLC/MAC header is reduced. The unused BSN bits are instead used to convey an extended TFI (eTFI) field. In each RLC/MAC header, the number of BSN fields depends on the MCS. There are one or two BSN fields for Enhanced General Packet Radio Service (EGPRS), one to three BSN fields for EGPRS2-A and one to four BSN fields for EGPRS2-B. The first BSN (the only BSN if only one RLC data unit is conveyed in the radio block) in the RLC/MAC header has 11 bits while the subsequent BSN fields (if any) have 10 bits each. This allows the protocol to uniquely identify up to 1024 outstanding RLC data blocks, i.e., the maximum addressable transmit window is 1024.

The actual window size is limited depending on the multi slot allocation according to the table below.

| RLC window size and required number of BSN bits | | | | | | | | |
|---|---|---|---|---|---|---|---|---|
| Number of timeslots assigned | 1 | 2 | 3 | 4 | 5 | 6 | 7 | 8-16 |
| Min allowed RLC window size | 64 | 96 | 160 | 160 | 224 | 320 | 352 | 512 |
| Max allowed RLC window size | 192 | 256 | 384 | 512 | 640 | 768 | 896 | 1024 |
| Required bits for first BSN | 7-9 | 8-9 | 9-10 | 9-10 | 9-11 | 10-11 | 10-11 | 10-11 |
| Required bits for other BSN(s) | 6-8 | 7-8 | 8-9 | 8-9 | 8-10 | 9-10 | 9-10 | 9-10 |

This means that for multi slot allocations of up to four timeslots, there are always redundant bits in the BSN field even with the maximum allowed RLC window size. With the minimum allowed RLC window size, there are redundant BSN bits for all multi slot allocations.

The RLC window size will impact the probability of stalling the RLC protocol. A smaller window size means larger probability of stalling. However, it can be envisaged that for applications such as MTC, the probability of RLC window stalling is inherently small since stalling mainly occurs when large amounts of data are transferred with high bitrates. Therefore, it can be considered to use RLC window sizes even smaller than the minimum allowed by 3GPP TS 44.060 v 11.0.0. Thus, it is typically possible to reduce the BSN field(s) by 1-3 bits (per RLC/MAC header) and use these bits for an extended TFI (eTFI). Note that even though it would be possible to free up more bits for an MCS with many BSNs in the RLC/MAC header, it may not be beneficial to have a TFI space size that varies with the MCS. Therefore, the MCSs with one BSN per RLC/MAC header can be used to set the limit. For MCSs with more than one BSN per RLC/MAC header there will be unused BSN bits that can be left unused or used for some other purpose. An implementation in accordance with these principles will give rise to a 2-8 times larger TFI space. A subset of this can be used for legacy MS, for which no BSN bits are used to convey eTFI. It is to be noted that an implementation in accordance with the fourth embodiment typically will have no backward compatibility issues.

The above methods all provide an extended TFI address space for the RLC/MAC data block. An alternative method is to extend the TFI address space for the PAN. Below some embodiments for extending the TFI using the PAN CRC are explored.

Extension of the TFI PAN Addressing Space

In accordance with a first exemplary embodiment, an encoding entity performs a binary XOR operation of the 5 bit TFI field with the PAN field CRC sum. However, as the CRC sum occupies 10 bits, the existing TFI field can be extended with and additional 5 bits to create a 10 bit TFI field. A new CRC sum generator polynomial will further increase the identifier space as it distinguishes the new 10 bit eTFI from the existing 5 bit TFI field. The new generator polynomial and eTFI field together increases the TFI addressing space that can be used for PAN addressing from 32 to $32 \times 2^{10}$ identifiers.

Thus, a new CRC generator polynomial is introduced, that generates a new CRC. This new CRC is decodable by new mobiles aware of the new polynomial. Then the TFI field is extended from 5 to 10 bits. This is possible since the CRC is 10 bits long. The 10 bit TFI field is XORed with the 10 bit CRC to create a new modified CRC. This new and modified CRC can only be read by a new mobile aware of the new polynomial and allocated the same TFI value.

It can be noted that already today the TFI is XORed with the PAN CRC to implicitly signal the TFI value to the receiving entity.

Given that the new PAN CRC is 10-bit long, this new TFI field can also be 10 bit long field which results in $2^{10}$ different code words.

The legacy 32 TFI code words can be used without consideration of the collisions with the usage of the same code words by legacy MSs. This is possible as the legacy MSs won't be able to decode the new PAN CRC.

Since the PAN field is intended to only be received by the same MS to which the PAN is addressed, there is no added restriction on the backwards compatibility when performing a binary XOR operation of the TFI with a new CRC of the PAN to generate an eTFI. I.e. it is only the receiver to which the PAN is intended that can decode the PAN, as per current functionality.

In accordance with this embodiment the downlink direction the BTS is preferably aware of the PAN TFI value and what CRC generator polynomial shall be applied during the encoding process. This information can be provided to the CCU from the PCU over the Abis interface.

In the uplink direction it is assumed that the BTS can be made aware of the TFI in the decoding process, or, alternatively adapted to perform a double CRC decoding.

Signaling of eTFI Capability

A device capable of reading an eTFI generated in accordance with any of the methods described herein in the manner as described will typically be adapted to make the network aware of this capability. The signaling that a device is capable of reading an eTFI can be achieved in a number of ways. In accordance with some embodiments, the device is adapted to indicate its capabilities in the MS Radio Access Capability Information Element (IE). Hence, one additional bit is added to this IE for this purpose.

In accordance with another alternative embodiment a new type of access burst is introduced in addition to the legacy (existing) access bursts. The new access burst is then to be used by a device that is capable of reading an eTFI. Whenever the network thus detects this new access burst, it will know that it originates from such a device that is capable of reading the eTFI field. The new access burst can e.g. be defined as a new code point in the 3GPP 44.060 EGPRS PACKET CHANNEL REQUEST message or by introducing a new training sequence that the new device shall use when transmitting the access request message (EGPRS PACKET CHANNEL REQUEST).

The information the network can be adapted to provide to a device upon Temporary Block Flow (TBF) assignment is dependent on the particular implementation. Information provided in different embodiments as described herein are exemplified below Extension of TFI for Addressing the RLC/MAC Data Block Version 1:
5 bit TFI value as per legacy operation and as currently specified in GERAN.
Ceil(log 2(N+1)) bits for indicating the usage one out of N additional CRC codes defined. Alternatively N+1 code points are needed to signal the used CRC.

Version 2:
5 bit TFI value as per legacy operation, and as currently specified in GERAN.
Up to 8 additional eTFI bits to form the full TFI field (up to 13 bits).

Version 3:
5 bit TFI value as per legacy operation and as currently specified in GERAN.
1 additional bit to indicate if extended TFI (6 bits) is used. This also implicitly signals that the PANI field is XORed with the header CRC.

Version 4:
5 bit TFI value as per legacy operation, and as currently specified in GERAN.
1 additional bit to indicate whether RLC/MAC headers with reduced BSN are used plus 4 additional bits to convey the eTFI and its length, e.g.,

```
{ 0                           -- Legacy
| 1    {0 <eTFI: bit(3)> --3 bit eTFI
       |10 <eTFI: bit(2)>-- 2 bit eTFI
       | 110 <eTFI: bit(1)>}  -- 1 bit eTFI
}
```

In accordance with some embodiments information elements, carrying the information provided in the different embodiments as described above, can be included in the messages transmitted from the network to the device upon TBF assignment, i.e. the uplink and downlink assignment or reconfiguration messages as described in Section 11.2 of 3GPP TS 44.060 v11.0.0, such as e.g. the Packet Downlink Assignment, Packet Uplink Assignment, Multiple TBF Downlink Assignment, Multiple TBF Uplink Assignment, Packet CS Release, Packet Timeslot Reconfigure Message or Multiple TBF Timeslot Reconfigure messages Extension of TFI in the PAN Up to 10 TFI bits to form the eTFI field. I.e. 5 bits in addition to the already defined TFI field.

Using the methods and devices as described herein can allow for more TBFs to be assigned per resource (timeslot or TRX). This can directly translate into the possibility to support more simultaneous users on these resources. Thus by providing the possibility to increase the TFI addressing space—a resource that may become the bottleneck in a near future—in a GERAN can improve the possibility to introduce MTC devices in GERAN. However, it is to be noted that even though the focus of this disclosure is on new MTC devices, the disclosure is of course equally applicable to other devices such as "normal" HTC devices.

The invention claimed is:

1. A method in a GSM/EDGE Radio Access Network (GERAN) network, the method comprising:
   determining a Temporary Flow Identity (TFI) comprising a first number of bits, wherein the TFI addresses a Temporary Block Flow (TBF) of a Radio Link Control/Medium Access Control (RLC/MAC) data block or a Piggy-backed Ack/Nack (PAN) using a first generator polynomial;
   addressing the TBF of said RLC/MAC data block or said PAN using a TFI having an increased number of bits compared to said first number of bits; and
   using a second generator polynomial different from the first generator polynomial, for addressing the TBF of said RLC/MAC data block or said PAN.

2. The method according to claim 1, wherein a header of the RLC/MAC data block is encoded using a first Cyclic Redundancy Check (CRC) generator polynomial, the method further comprising:
   introducing a number of N second CRC generator polynomials, different from the first CRC generator polynomial, for encoding of the header of the RLC/MAC data block.

3. The method according to claim 1, further comprising:
   performing a binary XOR operation of the TFI with a Cyclic Redundancy Check (CRC) of a header of the RLC/MAC data block.

4. The method according to claim 1, further comprising:
   extending a 5 bit TFI field to a 6 bit extended TFI field using a PAN Indicator (PANI) field in a header of the RLC/MAC data block of a Modulation and Coding Scheme.

5. The method according to claim 1, further comprising:
   reducing a number of bits used for one or more Block Sequence Number (BSN) fields in a header of the RLC/MAC data block to leave reduced BSN bits; and
   using said reduced BSN bits to convey bits of an extended TFI.

6. The method according to claim 1, the method further comprising:
   encoding a header of the RLC/MAC data block using a first Cyclic Redundancy Check (CRC) generator polynomial; and forming an extended TFI by performing an XOR operation of the TFI comprising the first number of bits, with a Cyclic Redundancy Check (CRC) sum of the PAN.

7. The method according to claim 1, wherein the method is used in a Base Transceiver Station for downlink transmission.

8. The method according to claim 1, wherein the method is used in a Mobile Station for uplink transmission.

9. A device in a GSM/EDGE Radio Access Network (GE-RAN) network, the device comprising:
controller circuitry configured to perform operations comprising:
determining a Temporary Flow Identity (TFI) comprising a first number of bits, wherein the TFI addresses a Temporary Block Flow (TBF) of a Radio Link Control/Medium Access Control (RLC/MAC) data block or a Piggy-backed Ack/Nack (PAN) using a first generator polynomial;
address addressing the TBF of said RLC/MAC data block or said PAN using a TFI having an increased number of bits compared to said first number of bits; and
using a second generator polynomial different from the first generator polynomial for addressing the TBF of said RLC/MAC data block or said PAN.

10. The device according to claim 9, wherein the controller circuitry is further configured to perform operations comprising:
encoding a header of the RLC/MAC data block using a first Cyclic Redundancy Check (CRC) generator polynomial, and
introducing a number of N second CRC generator polynomials, different from the first CRC generator polynomial, for encoding of the header of the RLC/MAC data block.

11. The device according to claim 9, wherein the controller circuitry is further configured to perform operations comprising:
performing a binary XOR operation of the TFI with a Cyclic Redundancy Check (CRC) of a header of the RLC/MAC data block.

12. The device according to claim 9, wherein the controller circuitry is further configured to perform operations comprising:
extending a 5 bit TFI field to a 6 bit extended TFI field using a PAN Indicator (PANI) field in a header of the RLC/MAC data block of a Modulation and Coding Scheme.

13. The device according to claim 9, wherein the controller circuitry is further configured to perform operations comprising:
reducing a number of bits used for one or more Block Sequence Number (BSN) fields in a header of the RLC/MAC data block to leave reduced BSN bits, and to use said reduced BSN bits to convey bits of an extended TFI.

14. The device according to claim 9, wherein the controller circuitry is further configured to perform operations comprising:
encoding a header of the RLC/MAC data block using a first Cyclic Redundancy Check (CRC) generator polynomial, and
forming an extended TFI by performing an XOR operation of the TFI comprising the first number of bits, with a Cyclic Redundancy Check (CRC) sum of the PAN.

15. The device according to claim 9, wherein the controller circuitry resides within a Base Transceiver Station.

16. The device according to claim 9, wherein the controller circuitry resides within a Mobile Station.

* * * * *

UNITED STATES PATENT AND TRADEMARK OFFICE
CERTIFICATE OF CORRECTION

PATENT NO. : 9,232,435 B2
APPLICATION NO. : 13/698433
DATED : January 5, 2016
INVENTOR(S) : Schliwa-Bertling et al.

Page 1 of 1

It is certified that error appears in the above-identified patent and that said Letters Patent is hereby corrected as shown below:

In the claims,

In Column 11, Line 18, in Claim 9, delete "address addressing" and insert -- addressing --, therefor.

Signed and Sealed this
Second Day of August, 2016

Michelle K. Lee
*Director of the United States Patent and Trademark Office*